Dec. 5, 1944.  L. M. TAYLOR  2,364,109
CRANKSHAFT AND METHOD FOR MAKING THE SAME
Filed May 5, 1941  2 Sheets-Sheet 1
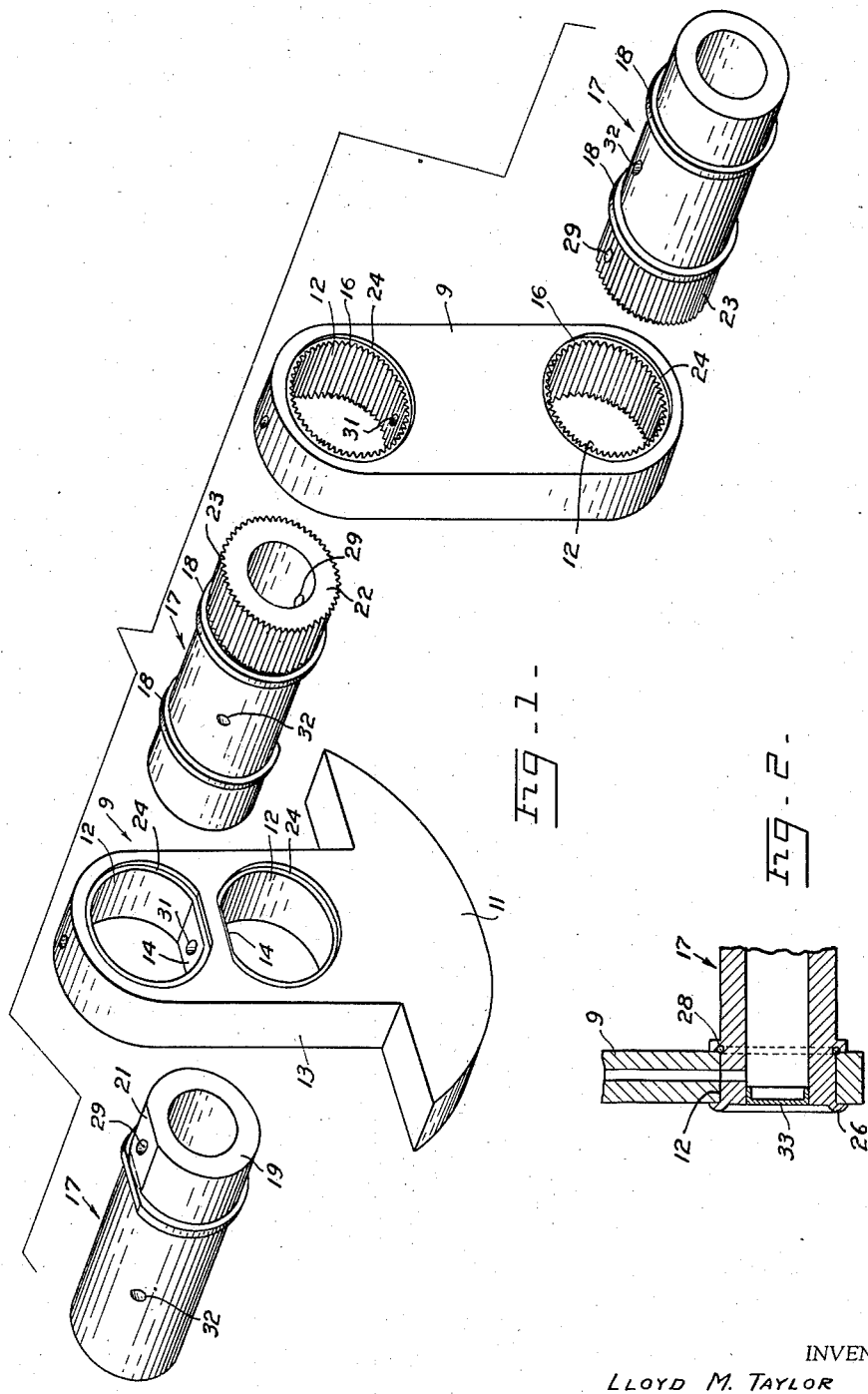
INVENTOR.
LLOYD M. TAYLOR
BY George B. White
ATTORNEY.

Dec. 5, 1944.  L. M. TAYLOR  2,364,109
CRANKSHAFT AND METHOD FOR MAKING THE SAME
Filed May 5, 1941  2 Sheets-Sheet 2
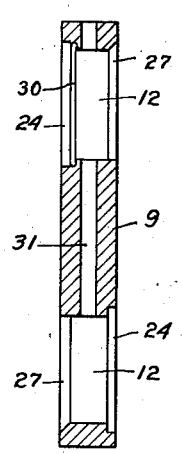
Fig. 3.
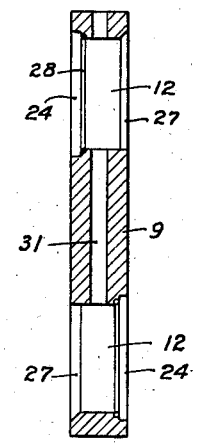
Fig. 4.
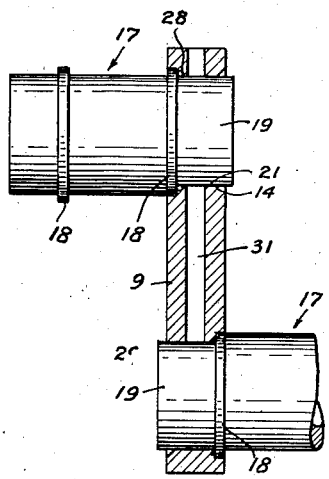
Fig. 5.
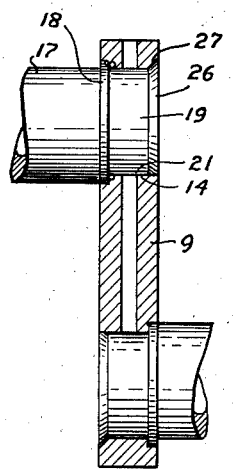
Fig. 6.
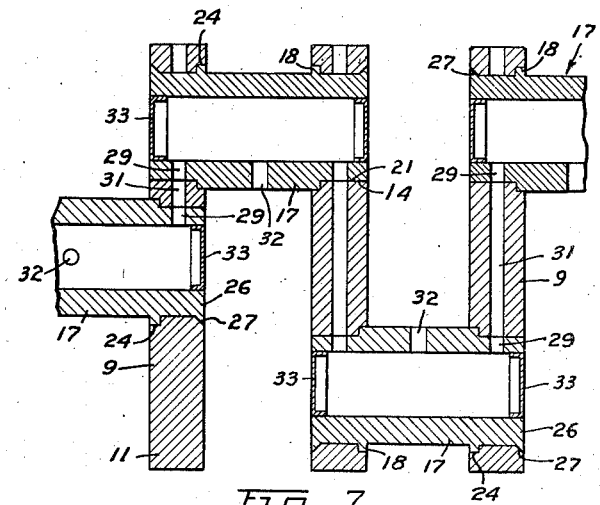
Fig. 7.
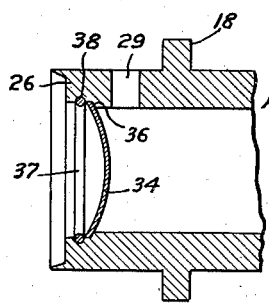
Fig. 8.
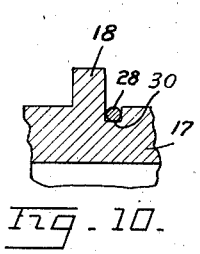
Fig. 10.
Fig. 9.
INVENTOR.
LLOYD M. TAYLOR
BY George B. White
ATTORNEY.

Patented Dec. 5, 1944

2,364,109

UNITED STATES PATENT OFFICE 2,364,109

CRANKSHAFT AND METHOD FOR MAKING THE SAME

Lloyd M. Taylor, San Leandro, Calif., assignor to Taylor Engines Inc., Oakland, Calif., a corporation of Nevada Application May 5, 1941, Serial No. 391,899

12 Claims. (Cl. 29—6)

This invention relates to a crank shaft and to the method for making the same.

Heretofore there were in use solid crank shafts made from one piece of material, and in some instances so-called built-up crank shafts, constructed of several parts. The built-up crank shafts have certain advantages over the solid crank shafts but the methods of making and the structure of the built-up crank shafts heretofore used had such disadvantages with respect to strength and securing of the parts together, that solid, machined crank shafts remained in general use particularly in internal combustion engines.

An object of this invention is to provide a method for making integral, strong crank shafts whereby the crank arms can be made of different material than the crank throws or pins, the respective materials to be most suitable for the strains and stresses on the respective parts.

The features of my method include a construction of the crank arms and crank throws for ready assembly and for the creation of pressures necessary for the welding of said parts together by the assembling operation; welding internally of the joints between the parts, making each individual part to best fit the conditions of its use, and producing an integral crank shaft, which is lighter yet stronger than comparative crank shafts heretofore used.

Another object of the invention is to provide a crank shaft which is made of hollow pins or throws integrally united with crank arms in such a manner that the crank arms extend at suitable angles and are solidly held in said assembled positions.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

With the foregoing and other objects in view, which will be made manifest in the following detailed description, reference is had to the accompanying drawings for the illustrative embodiment of the invention, wherein:

Fig. 1 is a perspective view of the parts of the crank shaft before assembly.

Fig. 2 is a fragmental sectional view of a joint between a pin and a crank arm.

Fig. 3 is a sectional detail view of a crank arm after it is bored.

Fig. 4 is a sectional detail view of the crank arm showing the step of placing the copper wire for welding in the bottom of the countersunk bores.

Fig. 5 is a partly sectional view showing the pins in place in the bores of the crank arm.

Fig. 6 is a partly sectional view showing the flaring of the end of the pin for exerting the welding pressure on the pin.

Fig. 7 is a sectional view of a section of the completed shaft.

Fig. 8 is a fragmental sectional view of a modified form of cap for the end of the hollow pins.

Fig. 9 is a fragmental sectional view of a shoulder of the bore in the crank arm, showing the location of the metal filler in a groove, and Fig. 10 is a fragmental sectional view of an end of a crank pin, showing the metal filler in a groove at the base of the flange.

In my method of making a crank shaft the crank arms and the crank pins are selected from different materials suitable for the respective stresses and strains to which these parts will be subjected in operation. For instance the crank arms are made of low carbon, soft, but tough, shock absorbing steel. The crank arm being an independently made part, can be machined so that the grain flow is parallel with the stresses exerted on the part. The crank pins or throws are made of abrasion-resistant and wear-resistant material of suitable hardness, preferably case hardened on the portions of its surface which operate as journals. The crank throws or pins are hollow tubular shafts or pins.

The crank arms are then machined and bores are formed therein so as to accommodate the ends of the respective crank pins or throws. These bores are preferably formed with countersunk ends and also recesses into which the filler wire can be inserted for the welding operation. The pins also have grooves for metal filler. These recesses and grooves for the metal filler are so located that the metal flows in both directions during welding. The bores in the crank arm and the corresponding inserted ends of the crank pins are so formed as to provide fitting partially plane surfaces for preventing relative rotation of the parts and also to provide a larger surface for the welding of the joints. The pins are provided with flanges or collars which fit into the countersunk holes or bores of the crank arms.

After the end of the crank pin is inserted into the crank arm then it is subjected to axial pressure by drawing the ends of the inserted portion of the pin against the respective ends of the bores or recesses in the crank arm. The force thus exerted is of sufficient strength to provide the pressure contact between the parts necessary for the welding operation. The fit between the ends of the crank pin and the bores of the crank arm is preferably press fit.

Before the pin is inserted in place filler material such as copper rings are placed in the recesses or grooves between the abutting parts of the joined ends of the pins and the bores of the crank arms. In some instances the joining surfaces may be covered with copper paste. After copper filler is in place and the parts are united under pressure the joint is subjected to suitable welding heat, for instance by subjecting the entire crank shaft to so-called hydrogen-copper welding treatment. Under this treatment the particles of copper and the adjacent particles of steel at the joints unite integrally in a very firm and solid union. Thereafter the entire crank shaft is subjected to usual heat treatment for hardening and conditioning the crank shaft for its use.

The first step of the method is shown in Figure 3 and indicates the prepared crank arm. Figure 4 shows the step of the insertion of the filler wire or copper ring in the recesses of the crank arm. Figure 5 indicates the placing of the prepared pins into the respective holes of the crank arm. This insertion fit is a press fit. The exertion of the axial pressure for the welding operation is then accomplished by turning or riveting the free ends of the pins over the cheek of the crank arm, for instance into the countersunk end of the bore as shown in Figure 6. This riveting operation will pull up the abutting portions of the crank pin against the respective shoulders of the bores of the crank arm. It is to be noted that the parts are automatically aligned by corresponding flattened or key portions of the bores and of the pin. The next step of the method is the closing of the ends of the cavity in the tubular crank pins. Then the assembled shaft is subjected to welding heat, and then annealed. The completed shaft is shown in Figure 7.

The product of my method is an article of manufacture which is a unitary crank shaft made of integrally united parts each of which is first separately conditioned for the particular strains and stresses to which it may be subjected in use.

This crank shaft includes crank arms 9 which may be provided with the usual balance weight portions 11. In the crank arms 9 are bores 12 spaced from each other in accordance with the distance of the throws required. The crank arm 9 is machined as at the edges 13 so that its grain flow is substantially parallel with the stresses on the crank arm 9. In each crank arm 9 the bore 12 has thereon a flat surface for alignment and for preventing relative rotation of the parts. In the form shown at the left of Figure 1 and also in Figures 3 to 6 inclusive this is accomplished by the provision of a flattened wall 14 in each bore 12. In the form shown on the right of Figure 1 the same result is accomplished by the provision of axial serrations 16 all around the periphery of the bores 12.

The crank arm 9 is made of steel of high tensile strength, tough but not brittle. The contour of the crank arm 9 is cut parallel with the grain flow. The bores 12 are preferably bored and broached so as to leave a comparatively rough surface.

The crank pins 17 are tubular hollow shaft members provided with collars or flanges 18 adjacent the opposite ends thereof. The space between the collars 18 provides the bearing surface for the connecting rods or bearing respectively. This surface between the flanges 18 is preferably case hardened. The pin 17 is made of hard steel so as to resist the stress and forces exerted on it by the connecting rods.

The ends of each pin 17 are formed on the outer periphery thereof so as to fit into the respective holes 12 of the crank arm 9. In the event the bores 12 in the crank arm 9 are provided with flattened key surfaces 14, then the end 19 of the pin 17 is also provided with a corresponding flat key portion 21. When the bores 12 of the crank arm 9 are formed with axial serrations 16, then the end 22 of the pin 17 is provided with serrations 23 which fit tightly into the corresponding serrations 16 of the bores 12. In either case the respective ends of the crank pin 17 are pressed into the corresponding bores 12 of the crank arm 9. It is preferable that the crank arms 9 be provided with countersunk recesses 24 at the respective ends of the bores 12 to accommodate the collars or flanges 18 at the respective ends of the crank pins 17. Each outer end of each pin 17 is provided with a lip which projects beyond the end of the bore 12 when the flange 18 is inside of the respective recesses 24. This projecting end 26 of the pins 17 is flared, turned, or riveted in such a manner as to tightly pull and hold the end of the pin 17 in pressure contact with the respective bore 12. In the form shown in Figure 2 the end 26 of the pin 17 is turned over the cheek of the crank arm 9 around the bore 12. In the forms shown in Figure 7 the end 26 of each crank 17 is riveted into suitable annular recesses 27 countersunk at said end of the bore 12.

The filler rod or wire, in this instance the copper ring 28 is placed into recesses or grooves 30 in the respective countersunk recesses, or at the roots of the respective pin flanges 18 so as to be subjected to pressure at the point of contact between the end of the pin 17 and the bore 12 of the crank arm 9. It is to be noted that these flange ends of the pins 17 provide an increased area for welding. In some instances the roughened surface or end of the pin 12 can be coated with copper paste. The circular groove at the corners of the bore 12 accommodates therein the copper ring 28 in such a manner that during the welding the binder or filler material flows in both directions.

Oil circulation of this crank is accomplished through the tubular pins 17. Each end of each pin 17 is provided with an oil aperture 29 which is aligned with an oil passage 31 extending in the crank arm 9 between the bores 12. Thus the oil or lubricant passes into the throws or pins 17 through the respective apertures 29 and through the passages 31 which form a continuous lubricant passage through the entire crank shaft from end to end. Suitable oil outlets 32 from the tubular pins 17 are provided preferably nearer to the axis of rotation so as to provide for centrifugal separation of the dirt from the oil before the oil flows out into the bearings. In the event of the use of the flat key surfaces 14 and 21 the pins are aligned automatically. In the event of the serrated surface 23 the ends of the pins should be so inserted in place that the oil aperture 29 thereof is in registry with the oil passage 31 in the crank arm 9. The flange 18 locates the aperture 29 at the proper depth inside of the bore 12. If it is desired to predetermine the relative angles of the throws then the oil apertures 29 at the opposit ends of the pins 17 are drilled at such relative angles to each other that the alignment of said apertures 29 with the respective oil passages 31 in the crank arms 9 will determine the relative angles of the crank arms 9 at the opposite ends of the pin 17. This can also be accomplished by correspondingly locating the key surface 21 at the respective relative angles at the opposite ends of the pin 17.

The ends of the pins 17 are suitably plugged. If permanent plugging is desired then a cap 33 is inserted into each end of each pin 17. These caps 33 are covered with a copper paste on their outer periphery or copper rings may be inserted for welding purposes, and the caps 33 are pressed into the respective ends of the hollow pins 17. Assembled in this manner the caps 33 are permanently welded in the ends of the pins 17 at the same time when the joints of the shaft are welded by the copper-hydrogen process.

In the event it is desirable to have an end of a pin 17 covered by a removable plug the form shown in Figure 8 can be used. This includes a dished disc 34 which fits into a shoulder 36 so that the convex side of the disc 34 protrudes inwardly of the cavity in the pin 17. A spring wire lock ring 37 is inserted into a groove 38 adjacent the shoulder 36 and immediately in front of the outer edges of the disc 34. Any oil pressure exerted from the inside of the cavity of the pin 17 tends to expand the disc 34 and thereby renders the seal firmer. This last mentioned plug can be removed by the removal of the lock ring 37, but when in place it seals by the oil pressure exerted against its convex face.

While the herein illustration of my method and crank shaft shows only one journal and two throws, it is to be understood that such a crank shaft may be constructed in accordance with my method with the number of journals and throws that may be needed in the engine in which the crank shaft is to be used. In all instances however the crank shaft is comparatively lighter than the usual solid crank shaft, yet my crank shaft is a very strong and well-balanced unitary integral shaft. The crank shaft herein described provides for simplicity of structure, lightness, comparative inexpense of manufacture by eliminating machine operations, proper distribution of stresses and strains, internal lubrication, definite and accurate adjustments, and is adaptable for the various conditions that arise in connection with the designing and operation of engines and the like.

I claim:

1. In a crank shaft construction of the character described, crank arms, each crank arm having spaced bores therein, crank pins, the ends of the crank pins fitting into the respective bores of the crank arms, means on the ends of the crank pins to secure the ends of the crank pins into said bores and against both ends of each bore by substantially axial force, and said ends of the crank pins being integrally united with said crank arms interiorly of the bores the portion of said ends of said crank pins adjacent the ends of said bores being larger than the interiors of the respective bores so as to confine said union to the space between the ends and interiorly of the bore.

2. In a crank shaft construction of the character described crank arms, each crank arm having spaced bores therein, hollow crank pins, coacting means on the ends of the crank pins and in the bores to determine the relative positions of the crank pins and the crank arms, said coacting means comprising fitting surfaces on the crank pin ends and within the bores for enlarging the contact surface of the respective parts, said meeting parts of the bores and the pin ends within the bores having recesses, said pin ends being integrally united with respective crank arms within said bores and at said recesses.

3. The method of rigidly connecting the component parts of a built up crank shaft embodying crank pins and crank arms with bores for the ends of the respective crank pins, which consists, in forming counterbores in both ends of each bore, forming a shoulder on a crank pin end to fit into one of said counterbores, placing welding material between the joining edges of said shoulder and counterbore inside the crank arm, forming an engagement head on the free end of the crank pin against the adjacent end of said bore so as to draw the joining edges and faces of the crank pin end with welding pressure against the corresponding sides and edges of the ends of the counterbores and against said welding substance and to confine said welding substance within the bore, and subjecting the assembled joint to welding heat.

4. A crank shaft of the character described comprising crank arms having spaced bores therein, crank pins, the ends of the crank pins fitting into the respective bores, each of said bores having a counterbore at least at one end thereof, each of said crank pins having a shoulder thereon fitting into said counterbore, means on the end of the crank pin to hold said pin in said bore, a recess at said shoulder in the bore and at the engaging portions of the pin end, said crank pins being integrally united with said crank arms by welding confined within said crank arms between said shoulder and said holding means.

5. A built-up crank shaft comprising crank arms with spaced bores therein, crank pins having their ends fitted in the respective bores and integrally welded to said crank arms, and coacting means on the ends of said crank pins and in said bores to confine said welding entirely within the respective bores.

6. A built-up crank shaft comprising crank arms with spaced bores therein, crank pins having their ends fitted in the respective bores, shoulders on said ends of said crank pins in pressure engagement with both ends of the respective bores, an end of said crank pins having a recess therein adjacent the sides of said shoulders pressed against the ends of said bores and being covered by said shoulder, said ends of said crank pins and the portions of said shoulders adjacent said bores being integrally united to said crank arms at said recesses and inside the bore.

7. A built-up crank shaft comprising crank arms with spaced bores therein, crank pins having their ends fitted in the respective bores, shoulders on said ends of said crank pins in pressure engagement with both ends of the respective bores, an end of said crank pins having a recess therein adjacent the sides of said shoulders pressed against the ends of said bores and being obstructed from the outside by said shoulders the ends of said bores having recesses to hold welding material, said ends of said crank pins and the portions of said shoulders adjacent to said recesses being integrally welded to said crank arms between said shoulders.

8. A built-up crank shaft comprising crank arms with spaced bores therein, crank pins having their ends fitted in the respective bores, shoulders on said ends of said crank pins in pressure engagement with both ends of the respective bores, said bores having counterbores at the ends thereof to fit over said shoulders, certain of said shoulders and the bases of the adjacent counterbores having recesses therebetween, and said crank pin ends being integrally welded to said crank arms at said recesses and in the bore between said shoulders.

9. A built-up crank shaft comprising crank arms having spaced bores therethrough, crank pins, the ends of each bore being counterbored, a shoulder on the crank pin spaced from the end of the crank pin fitting into one of the counterbores of a bore, the end of the crank pin being enlarged and pressed into the other counterbore of said bore so as to draw up said shoulder and said enlarged end under welding pressure against the ends of said bore, said crank pin ends being integrally united with said crank arms entirely within said bores between said counterbores.

10. A crank shaft of the character described, comprising crank arms, having spaced bores therein corresponding to the desired throws, each of said bores having a counterbore at an end thereof, a crank pin between said crank arms, a shoulder formed on said crankpin spaced from the end of said crankpin and fitting into said counterbore, the other end of said crank pin being spread and drawn up against the other end of the bore so as to press said shoulder and said spread end of the crank pin against the respective ends of the bore, said crank pin and crank arm being united by welding within said bore, said shoulder and spread end confining said welding between the ends and within said bore.

11. The method of rigidly connecting the component parts of a built-up crank shaft employing crank pins and crank arms with bores for the ends of the respective crank pins which consists, in forming axially abutting surfaces in said bores and on said pins, holding welding material in each of said bores between said abutting surfaces, spreading the end of each pin over the end of the respective bore so as to draw said abutting surfaces tightly against said welding material, and subjecting said joint crank pins and crank arms to welding heat so as to unite them within said bores.

12. The method of rigidly connecting the component parts of a built-up crank shaft employing crank pins and crank arms with bores for the ends of the respective crank pins, which consists in forming axially abutting surfaces in said bores and on the respective pins, forming recesses between said axially abutting surfaces, inserting the crank pins into the respective boxes, holding welding material in said recesses and between said axially abutting surfaces of the respective crank pin ends and said bores so as to confine said welding material within said bores, forming an engagement head at the ends of the crank pins against the adjacent ends of the respective bores so as to axially draw said abutting surfaces together, and subjecting the assembled joints to welding heat.

LLOYD M. TAYLOR.